United States Patent [19]
Tanaka et al.

[11] Patent Number: 4,918,111
[45] Date of Patent: Apr. 17, 1990

[54] COMPOSITION FOR NON-CROSSLINKED FOAM

[75] Inventors: Haruhiko Tanaka, Ohtake; Fukashi Kagawa, Yamaguchi; Kouji Nakashima, Hiroshima, all of Japan

[73] Assignee: Shell Oil Company, Houston, Tex.

[21] Appl. No.: 232,736

[22] Filed: Aug. 15, 1988

Related U.S. Application Data

[62] Division of Ser. No. 158,487, Feb. 22, 1988, Pat. No. 4,791,143.

[30] Foreign Application Priority Data

Feb. 28, 1987 [JP] Japan ................................ 62-44056

[51] Int. Cl.$^4$ ................................ C08J 9/6; C08J 9/12
[52] U.S. Cl. ................................ 521/89; 521/59; 521/92; 521/93; 521/94; 521/95; 521/98; 521/81; 521/134
[58] Field of Search ................ 521/134, 81, 59, 89

[56] References Cited

U.S. PATENT DOCUMENTS 4,359,544 11/1982 Hwo et al. ........................ 524/232
4,522,955 6/1985 Fukushima et al. ............... 521/143
4,540,071 9/1985 Senoa et al. ....................... 521/58
4,567,208 1/1986 Kuwabara et al. ................ 521/59
4,587,270 5/1986 Kuwabara et al. ................ 521/58
4,596,833 6/1986 Endo et al. ........................ 521/60
4,617,323 10/1986 Kuwabara eet al. .............. 521/60
4,626,555 12/1986 Endo ................................. 521/59
4,739,547 4/1988 Tanaka et al. .................... 521/81
4,791,147 12/1988 Tanaka et al. .................... 521/81

FOREIGN PATENT DOCUMENTS 040167 9/1979 Japan .
129025 1/1982 Japan .

OTHER PUBLICATIONS

Copending Application Ser. No. 121,497, filed 11/16/87.

Primary Examiner—Morton Foelak

[57] ABSTRACT

An expandable composition for non-crosslinked foam comprising:
(a) 80 to 99% by weight of a 1-butene copolymer,
(b) 20 to 1% by weight of an ethylene polymer, and
(c) a blowing agent, the percentages being based on the total weight of the 1-butene copolymer and the ethylene polymer.

16 Claims, No Drawings

COMPOSITION FOR NON-CROSSLINKED FOAM

This is a division, of application Ser. No. 158,487, filed Feb. 22, 1988 now U.S. Pat. No. 4,791,143.

CROSS-REFERENCE TO PREVIOUSLY FILED RELATED APPLICATION

"Non-Crosslinked Foam", Haruhiko Tanaka, Fukashi Kagawa, and Kouji Nakashima, Ser. No. 096,100 now U.S. Pat. No. 4,739,547 and "Non-Crosslinked Foam, Haruhiko Tanaka, Fukashi Kagawa, and Kouji Nakashima, Ser. No. 121,487 now abandoned.

BACKGROUND OF THE INVENTION

This invention relates to a composition for non-crosslinked foam composed of a major proportion of a 1-butene polymer, a minor proportion of an ethylene polymer and a blowing agent. More specifically, this invention relates to an expandable composition suited to give a non-crosslinked foam excellent in heat resistance, flexibility and creep resistance.

Plastic foam products find wide applications in the fields of automobiles, household appliances, packing members, clothes, food, medical products, etc. as thermally insulating materials and cushioning materials by making use of their light weight, thermal insulating properties and cushioning properties.

Properties required of foam products are generally light weight, thermal insulating properties and cushioning properties. However, in accordance with various needs in the world, new foams having new characteristics, for example, more flexible foams or foams having excellent heat resistance have been increasingly demanded. There are many plastic materials used in foam products. Of these, typical thermoplastic resins are high-pressure low-density polyethylene and polystyrene. These resins have been used as foam products naturally by focussing attention on their mechanical properties but largely due to ease of expansion molding. Though the high-pressure low-density polyethylene and polystyrene have excellent expandability, they have poor heat resistance, and their maximum use temperature is about 80° C. to about 90° C.; they cannot be used at a high temperature above 100° C. Meanwhile, in the aspect of heat resistance, polypropylene is excellent, but polyproylene alone can hardly give a uniform foam.

Japanese Patent Publication No. 40,167/1981 discloses a foam prepared from a mixture of 90 to 30% by weight of polypropylene and 10 to 70% by weight of polybutene-1. The patent publication states that this foam has excellent heat resistance, high-temperature creep characteristics, mechanical strength and thermal insulating properties and is suitable for use as a thermally insulating material for high-temperature structures. It also states that when the mixing proportions of polypropylene and polybutene-1 fall outside the above-specified ranges, a good foam cannot be obtained.

Japanese Laid-Open Patent Application No. 129,025/1983 discloses a polyolefin foam prepared from a mixture of (a) 60 to 98% by weight of a propylene-/ethylene block copolymer having a melt index of 0.5 to 2.0 and an ethylene content of 5 to 15%, (b) 1 to 20% by weight of polybutene or a butene copolymer having a melt index of 2 to 10, and (c) 1 to 20% by weight of low-density polyethylene having a melt index of 2 to 10.

However, the foams described in the above documents are, though excellent in heat resistance, poor in flexibility because they are too hard owing to mechanical properties of polypropylene, and cannot be used as thermally insulating materials for curved piping portions or for packing materials in bottle closures requiring flexibility. When the foams are used as thermally insulating materials for clothes and cushioning materials of medical products, they are required to be better in flexibility and elastic recovery than the conventional foams.

Like polyethylene and polypropylene, poly-1-butene is a polyolefin resin having flexibility and heat resistance and excellent high-temperature creep characteristics. Moreover, a copolymer of 1-butene and another alpha-olefin is used in the field requiring flexibility and creep resistance because when the content of alpha-olefin increases, the melting point lowers and heat resistance also decreases, but flexibility improves. The 1-butene polymer thus possesses these excellent characteristics but is similar in viscoelasticity to polypropylene. Therefore, like polypropylene, the 1-butene polymer alone does not afford a uniform foam.

U.S. Pat. No. 4,359,544 discloses a composition comprising a 1-butene polymer, as little as 0.02 to 5.0% by weight of stearamide and as little as 0.02 to 5.0% by weight of high-density polyethylene, said composition having high crystallizability and providing a film having improved tensile strength, modulus of elasticity and creep resistance. This U.S. Patent makes no mention of foams.

It is an object of this invention to provide an expandable composition that gives a non-crosslinked foam comprising a 1-butene polymer and an ethylene polymer.

Another object of this invention is to provide a novel expandable composition that gives a non-crosslinked foam suitable for use as a thermally insulating material, a cushioning material and as a capliner material having excellent flexibility, heat resistance, creep resistance, cushioning properties and hygienic properties.

Still another object of this invention is to provide a non-crosslinked foam obtained from an expandable composition of this invention.

Further objects and advantages of this invention will be made clear in the specification.

SUMMARY OF THE INVENTION

This invention, is an expandable composition for non-crosslinked foam comprising:
(a) 80 to 99% by weight of a 1-butene polymer,
(b) 20 to 1% by weight of an ethylene polymer, and
(c) a blowing agent,
wherein the percentages are based on the total weight of the combination of 1-butene polymer and ethylene polymer.

The 1-butene polymer (a) used in this invention, includes a homopolymer of 1-butene or a copolymer of at least 70 mole%, preferably at least 80 mole%, of polymerized units of 1-butene and not more than 30 mole%, preferably not more than 20 mole%, of polymerized units of an alpha-olefin having 2 to 20 carbon atoms other than 1-butene.

Examples of alpha-olefins having 2 to 20 carbon atoms and usable herein include ethylene, propylene, 4-methyl-1-pentene, 1-hexene, 1-octene, 1-decene, 1-tetradecene, and 1-octadecene.

The 1-butene polymer (a) is preferably a crystalline polymer having a melt flow rate [MFR(E):ASTM D1238, E] of 0.01 to 50 g/10 min., preferably 0.05 to 20 g/10 min. When MFR(E) is less than 0.01 g/10 min., melt extrusion is hard to perform at the time of expansion molding. When MFR(E) exceeds 50 g/10 min., melt viscosity is low and expandability is poor.

The ethylene polymer (b) used in this invention includes a copolymer comprising a homopolymer of ethylene and at least 90 mole%, preferably at least 95 mole% of polymerized units of ethylene and not more than 10 mole%, preferably not more than 5 mole% of polymerized units of an alpha-olefin having 3 to 20 carbon atoms other than ethylene.

Examples of alpha-olefins having 3 to 20 carbon atoms and usuable herein include propylene, 1-butene, 4-methyl-1-pentene, 1-hexene, 1-octene, 1-decene, 1-tetradecene, and 1-octadecene.

The ethylene polymer (b) is preferably a polymer having a melt flow rate [MFR (E):ASTM D1238, E] of 0.01 to 50 g/10 min., preferably 0.03 to 30 g/10 min. Where MFR (E) is less than 0.01 g/10 min., melt extrusion is hard to perform at the time of expansion molding. Where MFR(E) exceeds 50 g/10 min., melt viscosity is low and expandability is poor.

The ethylene polymer (b) is preferably a crystalline polymer with a density of at least 0.920 g/cm$^3$, preferably at least 0.940 g/cm$^3$, more preferably at least 0.950 g/cm$^3$.

Examples of the blowing agent (c) used in this invention include evaporatable blowing agents, for example, fluorinated aliphatic hydrocarbons such as trichloromonofluoromethane and dichlorotetrafluoroethane, and aliphatic hydrocarbons such as propane, methyl chloride, isobutane, pentane and hexane; and decomposable blowing agents such as sodium bicarbonate, ammonium carbonate, azodicarbon amide, barium azodicarboxylate, N,N'-dinitrosopentamethylenetramine, 4,4-oxybis(benzenesulfonyl hydrazide), diphenylsulfone-3,3-disulfonyl hydrazide, p-toluene-sulfonyl semicarbazide, trihydrazinotriazine and biurea. These blowing agents can be used singly or in combination in the present invention. Among these blowing agents, it is preferable to use singly or conjointly fluorinated aliphatic hydrocarbons such as dichlorotetrafluoroethane chemically stable and having a great evaporation latent heat, and azodicarbonamide and sodium bicarbonate in which an amount of gas generated is large and a temperature of terminating formation of a gas is much lower than a heat deterioration starting temperature of a 1-butene polymer (a)/ethylene polymer (b) mixture.

The composition for non-crosslinked foam in this invention comprises 80 to 99% by weight, preferably 90 to 98% by weight, of the 1-butene polymer (a), 20 to 1% by weight, preferably 10 to 2% by weight, of the ethylene polymer (b) and the blowing agent (c).

The composition for non-crosslinked foam in this invention may contain, in addition to the 1-butene polymer (a), the ethylene polymer (b) and the blowing agent (c), a low-crystallinity or amorphous alpha-olefin random copolymer in such amount as not to impair the objects of this invention, for example, not more than 20 parts by weight per 100 parts by weight of the mixture of the 1-butene polymer (a) and the ethylene copolymer (b). Examples thereof are a propylene/1-butene random copolymer, a propylene/ethylene random copolymer, an ethylene/1-butene random copolymer, an elastomer such as an ethylene/propylene terpolymer, and other low-crystallinity polyolefins such as polypropylene, poly-4-methyl-pentene and an ethylene/vinyl acetate copolymer.

When the ethylene polymer (b) contained in the composition for non-crosslinked foam in this invention is less than 1% by weight, expandability is lessened owing to bad compatibility, making it impossible to provide a good foam. The amount of the blowing agent (c) is properly adjusted depending on an intended foam. It is usually 0.2 to 30 parts by weight, preferably 0.5 to 20 parts by weight based on the total weight, 100 parts by weight, of the 1-butene polymer (a) and the ethylene polymer (b). When the amount of the blowing agent (c) is less than 0.2 part by weight, it seems unlikely to obtain a foam having a good expansion ratio.

As a method for producing a non-crosslinked foam using the composition of this invention, a so-called extrusion foaming method can be taken wherein the composition comprising the 1-butene polymer (a), the ethylene polymer (b) and the blowing agent (c) is extruded from a die in molten or softened state to expand a gas generated from the blowing agent contained in the composition at high to normal pressures.

The composition used in this invention can contain, besides the blowing agent, additives ordinarily used in polyolefins, such as heat-resistant stabilizers, slip agents and antistatic agents, in such amounts as not to impair the objects of this invention.

The non-crosslinked foam obtained from the composition of this invention may be in various forms such as sheets, pipes, rods and tubes, by properly changing a die of an extrusion molding machine.

The composition for non-crosslinked foam in this invention can allow easy expansion molding without crosslinking compared to the 1-butene polymer which was difficult to expansion mold without crosslinking. The resulting foam is made of uniform, fine closed cells. Moreover, as the composition is composed mainly of the 1-butene polymer, it is better than the ordinary high-pressure low-density polyethylene foam and polystyrene foam in heat resistance, flexibility, creep resistance, cushioning properties, and hygienic properties. These foams can properly be ued in thermally insulating materials of high-temperature structures and packing materials requiring high-temperature sterilization treatment, such as bottle closures.

The following Examples illustrate this invention in more detail, but his invention is not limited at all to these Examples unless it departs from its spirit and scope.

EXAMPLE 1

One hundred parts by weight of a resin mixture (PB-1+HDPE) composed of 95% by weight of a 1-butene homopolymer [PB-1:MFR (E)=2 g/10 min., melting point: 125° C.] and 5% by weight of high-density polyethylene [HDPE; MFR (E)=0.1 g/10 min., density 0.960 g/cm$^3$, melting point 132° C.] was mixed by a tumbler with 0.5 part by weight of azodicarbonamide (ADCA; Vinfor AC#6, a tradename for a product of Eiwa Chemical Industry Co., Ltd.) as a blowing agent. Subsequently, the mixture was melt-kneaded in a single-screw extruder (screw diameter 40 mm, set temperature 190° C.) and extruded frm a pipe-forming die (set temperature 120° C.) to form a pipe-like foam. The resulting foam was of a smooth surface and had an apparent specific volume (volume/weight found from an external size) of 2.1 and a true specific volume (measured by an air compression picnometer of Beckman) of 2.0. It was a good foam made of uniform, fine closed cells.

EXAMPLES 2 AND 3

Example 1 was repeated except that the proportion of HDPE was changed as shown in Table 1. As a result, a foam made of uniform, fine closed cells and having a smooth surface was obtained as shown in Table 1.

EXAMPLES 4 AND 5

One hundred parts by weight of a resin mixture (PB-II+HDPE) composed of a 1-butene/ethylene random copolymer [PB-II: MFR (E)=0.2 g/10 min., ethylene content 12 mole%, melting point 103° C.] and HDPE used in Example 1 in amounts shown in Table 1 was mixed by a tumbler with 5 parts by weight of ADCA as a blowing agent. The mixture was then melt-kneaded in a single-screw extruder (screw diameter 40 mm; set temperature 190° C.), and extruded from a pipe-forming die (set temperature 95° C.) to afford a pipe-like foam.

The resulting foam was made of uniform, fine closed cells and had a smooth surface as noted in Table 1.

COMPARATIVE EXAMPLE 1

Example 1 was followed but using PB-I alone.

The cellular film of the obtained foam was broken, the surface was heavily uneven and the specific volume was low.

COMPARATIVE EXAMPLE 2

Example 1 was followed but using PB-I and HDPE in amounts shown in Table 1.

There was a big difference between the apparent and true specific volumes of the resulting foam and said foam was seen to be open-cellular, with small raisings and depressions observed on the surface.

COMPARATIVE EXAMPLE 3

Example 4 was followed but using PB-II alone.

The cellular film of the obtained foam was broken, the surface was heavily uneven and the expansion ratio was low. Thus, the foam was not good.

COMPARATIVE EXAMPLE 4

Example 4 was followed but using PB-II and HDPE as shown in Table 1.

The surface of the obtained foam was not so heavily uneven as in Comparative Example 3 but had small raisings and depressions. Moreover, there was a big difference in apparent and true specific volumes of the foam, and the foam appeared to be open-cellular.

TABLE 1

| | RESIN | | | BLOWING AGENT ADCA | PROPERTIES OF FOAM | | |
| --- | --- | --- | --- | --- | --- | --- | --- |
| | PB-I wt. % | PB-II wt. % | HDPE wt. % | parts by weight | Apparent Expanded* state and appearance | True specific volume cc/g | specific volume cc/g |
| Example 1 | 95 | — | 5 | 0.5 | O | 2.1 | 2.0 |
| Example 2 | 90 | — | 10 | 0.5 | O | 2.2 | 2.2 |
| Example 3 | 85 | — | 15 | 0.5 | O | 2.0 | 1.9 |
| Example 4 | — | 95 | 5 | 5 | O | 10.3 | 8.5 |
| Example 5 | — | 90 | 10 | 5 | O | 9.8 | 8.2 |
| Example 6 | — | 85 | 15 | 5 | O | 9.6 | 8.2 |
| Comparative Example 1 | 100 | — | — | 0.5 | X | 1.6 | 1.4 |
| Comparative Example 2 | 70 | — | 30 | 0.5 | Δ | 1.8 | 1.3 |
| Comparative Example 3 | — | 100 | — | 5 | X | 2.8 | 1.9 |
| Comparative Example 4 | — | 70 | 30 | 5 | Δ | 6.3 | 2.8 |

*O: There are uniform, fine closed cells and a surface is smooth.
Δ: There are partly open cells and small raisings and depressions are observed on a surface.
X: A cellular film is broken and a surface is heavily uneven.

What is claimed is:

1. An expandable composition for non-crosslinked foam comprising:
   (a) 80 to 99% by weight of a 1-butene copolymer,
   (b) 20 to 1% by weight of an ethylene polymer containing at least 90 mole% of polymerized units of ethylene, and
   (c) a blowing agent, the percentages being based on the total weight of the 1-butene copolymer and the ethylene polymer wherein the 1-butene copolymer is composed of at least 70 mole% of polymerized units of 1-butene and not more than 30 mole% of polymerized units of an alpha-olefin having 2 to 20 carbon atoms other than 1-butene.

2. The composition of claim 1 wherein the 1-butene copolymer has a melt flow rate of 0.01 to 50 g/min.

3. The composition of claim 1 wherein the ethylene polymer is an ethylene homopolymer.

4. The composition of claim 1 wherein the ethylene polymer is a copolymer composed of at least 90 mole% of polymerized units of ethylene and not more than 10 mole% of polymerized units of an alpha-olefin having 3 to 20 carbon atoms other than ethylene.

5. The composition of claim 1 wherein the ethylene polymer has a melt flow rate of 0.01 to 50 g/min.

6. The composition of claim 1 which comprises 90 to 98% by weight of the 1-butene copolymer and 10 to 2% by weight of the ethylene polymer.

7. The composition of claim 1 wherein the blowing agent is contained in an amount of 0.2 to 30 parts by weight, based on the total weight, 100 parts by weight, of the 1-butene copolymer and the ethylene polymer.

8. A non-crosslinked foam produced from the composition of claim 1.

9. The composition of claim 1, wherein the 1-butene copolymer is composed of at least 80 mole% of polymerized units of 1-butene and not more than 20 mole% of polymerized units of an olefin having 2 to 20 carbon atoms other than 1-butene.

10. The composition of claim 1, wherein the ethylene polymer is a copolymer composed of at least 95 mole% of polymerized units of ethylene and not more than 5 mole% of polymerized units of an alpha-olefin having 3 to 20 carbon atoms other than ethylene.

11. The composition of claim 1, wherein the 1-butene copolymer has a melt flow rate of 0.05 to 20 g/10 min.

12. The composition of claim 1, wherein the ethylene polymer has a melt flow rate of 0.03 to 30 g/10 min.

13. The composition of claim 1, wherein the blowing agent is at least one evaporable blowing agent.

14. The composition of claim 1, wherein the blowing agent is selected from the group consisting of fluorinated aliphatic hydrocarbons, aliphatic hydrocarbons, and decomposable blowing agents.

15. The composition of claim 1, wherein the blowing agent is selected from the group consisting of trichloromonofluoromethane, dichlorotetrafluoroethane, propane, methyl chloride, isobutane, pentane, hexane, sodium bicarbonate, ammonium carbonate, azodicarbon amide, barium azodicarboxylate, N,N'-dinitrosopentamethylenetramine, 4,4-oxybis(benzenesulfonyl hydrazide), diphenylsulfone-3,3-disulfonyl hydrazide, p-toluenesulfonyl semicarbazide, trihydrazinotriazine and biurea.

16. The composition of claim 1, wherein the blowing agent is selected from the group consisting of dichlorotetrafluoroethane, azodicarbonamide, sodium bicarbonate, and mixtures thereof.

* * * * *